US009758154B2

(12) United States Patent
Aoki

(10) Patent No.: US 9,758,154 B2
(45) Date of Patent: Sep. 12, 2017

(54) HYBRID VEHICLE

(71) Applicant: TOYOTA JIDOSHA KABUSHIKI KAISHA, Toyota-shi, Aichi-ken (JP)

(72) Inventor: Takanori Aoki, Nissin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/953,657

(22) Filed: Nov. 30, 2015

(65) Prior Publication Data
US 2016/0152225 A1 Jun. 2, 2016

(30) Foreign Application Priority Data

Dec. 1, 2014 (JP) ................................. 2014-243462

(51) Int. Cl.
| | |
|---|---|
| *B60W 20/00* | (2016.01) |
| *B60W 20/13* | (2016.01) |
| *B60W 10/06* | (2006.01) |
| *B60W 10/08* | (2006.01) |
| *B60K 6/445* | (2007.10) |

(52) U.S. Cl.
CPC ............ *B60W 20/13* (2016.01); *B60K 6/445* (2013.01); *B60W 10/06* (2013.01); *B60W 10/08* (2013.01); *B60W 2510/244* (2013.01); *B60Y 2200/92* (2013.01); *Y02T 10/6239* (2013.01); *Y02T 10/6286* (2013.01); *Y02T 10/7077* (2013.01); *Y10S 903/93* (2013.01)

(58) Field of Classification Search
CPC ....... B60K 6/365; B60K 6/445; B60W 10/06; B60W 10/08; B60W 20/13; B60W 2510/244; B60W 2710/0677; B60W 2710/086; B60W 10/24; B60W 10/26; B60W 2710/24–2710/244; B60Y 2200/92; Y10S 903/93; Y02T 10/7077; Y02T 10/6286; Y02T 10/6239
USPC ........................ 701/22; 180/65.265; 903/930
See application file for complete search history.

(56) References Cited

U.S. PATENT DOCUMENTS

| | | | | |
|---|---|---|---|---|
| 6,005,297 A | * | 12/1999 | Sasaki .................... | B60K 6/365 180/65.235 |
| 6,478,705 B1 | * | 11/2002 | Holmes ................. | B60W 20/40 475/5 |

(Continued)

FOREIGN PATENT DOCUMENTS

| | | |
|---|---|---|
| CN | 101512827 A | 8/2009 |
| JP | 2004-119271 | 4/2004 |

(Continued)

*Primary Examiner* — Fadey Jabr
*Assistant Examiner* — Angelina Shudy
(74) *Attorney, Agent, or Firm* — Finnegan, Henderson, Farabow, Garrett & Dunner, LLP

(57) ABSTRACT

A hybrid vehicle includes an engine, a first motor, a planetary gear, a second motor, a battery and an electronic control unit. The electronic control unit is configured to execute control such that a reverse travel is made while higher power than power before the positive electrode potential becomes at most equal to a second specified potential is output from the engine when the positive electrode potential becomes at most equal to the second specified potential during the reverse travel, and in which the second specified potential is higher than a first specified potential.

4 Claims, 6 Drawing Sheets

(56) References Cited

U.S. PATENT DOCUMENTS

| | | | | |
|---|---|---|---|---|
| 7,101,298 | B2* | 9/2006 | Sowul | B60K 6/365 |
| | | | | 475/5 |
| 7,479,080 | B2* | 1/2009 | Usoro | B60K 6/365 |
| | | | | 180/65.25 |
| 8,018,203 | B2* | 9/2011 | Nishi | B60K 6/365 |
| | | | | 320/124 |
| 8,235,853 | B2* | 8/2012 | Lutoslawski | B60K 6/365 |
| | | | | 475/5 |
| 8,562,482 | B2* | 10/2013 | Shibata | B60K 6/365 |
| | | | | 180/65.28 |
| 8,666,572 | B2* | 3/2014 | Mitsutani | B60K 1/02 |
| | | | | 701/22 |
| 8,798,832 | B2* | 8/2014 | Kawahara | H01M 10/441 |
| | | | | 701/22 |
| 9,561,719 | B2* | 2/2017 | Lo | B60L 11/12 |
| 9,592,832 | B2* | 3/2017 | Nedorezov | B60W 10/026 |
| 2004/0251064 | A1* | 12/2004 | Imai | B60W 20/40 |
| | | | | 180/65.23 |
| 2005/0221939 | A1* | 10/2005 | Takami | B60K 6/365 |
| | | | | 475/5 |
| 2006/0148606 | A1* | 7/2006 | Bucknor | B60K 6/365 |
| | | | | 475/5 |
| 2008/0009380 | A1* | 1/2008 | Iwanaka | B60K 6/365 |
| | | | | 475/5 |
| 2009/0115354 | A1* | 5/2009 | Heap | B60K 6/365 |
| | | | | 318/8 |
| 2009/0120699 | A1* | 5/2009 | Suzuki | B60L 15/2045 |
| | | | | 180/65.265 |
| 2010/0033132 | A1* | 2/2010 | Nishi | B60K 6/365 |
| | | | | 320/136 |
| 2010/0316922 | A1* | 12/2010 | Hamada | B60L 1/003 |
| | | | | 429/432 |
| 2011/0313613 | A1* | 12/2011 | Kawahara | H01M 10/441 |
| | | | | 701/34.4 |
| 2015/0210266 | A1* | 7/2015 | Yang | B60K 6/387 |
| | | | | 701/22 |
| 2016/0075322 | A1* | 3/2016 | Saito | B60W 20/10 |
| | | | | 701/22 |
| 2016/0152152 | A1* | 6/2016 | Gaither | B60L 11/1809 |
| | | | | 701/22 |
| 2016/0257293 | A1* | 9/2016 | Takahashi | H02J 7/0091 |
| 2016/0325725 | A1* | 11/2016 | Yang | B60K 1/02 |

FOREIGN PATENT DOCUMENTS

| | | |
|---|---|---|
| JP | 2009-161132 A | 7/2009 |
| JP | 2009-166593 A | 7/2009 |
| JP | 2011-183910 A | 9/2011 |
| JP | 2013-6430 | 1/2013 |
| JP | 2013006430 A * | 1/2013 |
| JP | 2013-154706 A | 8/2013 |

* cited by examiner

F I G . 1
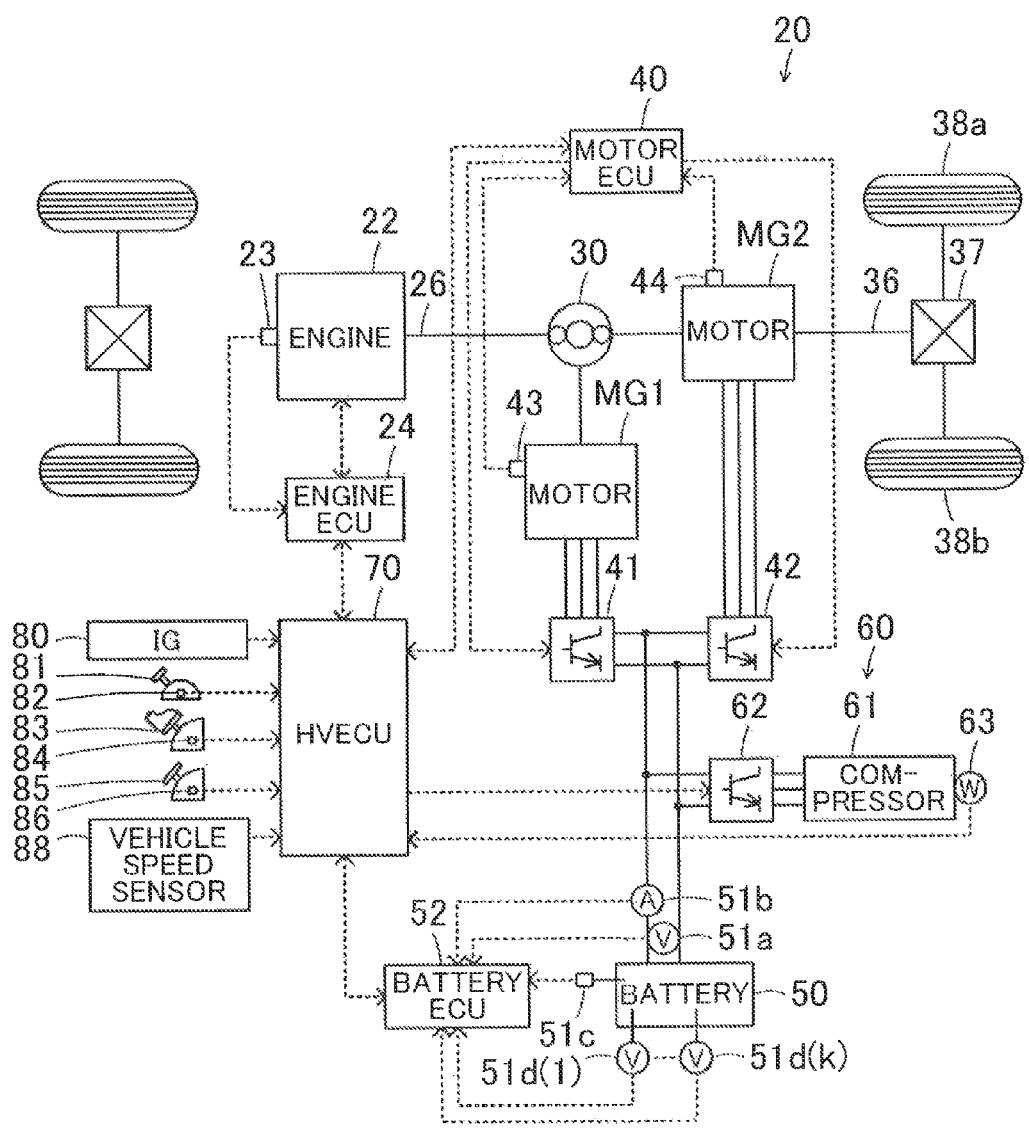

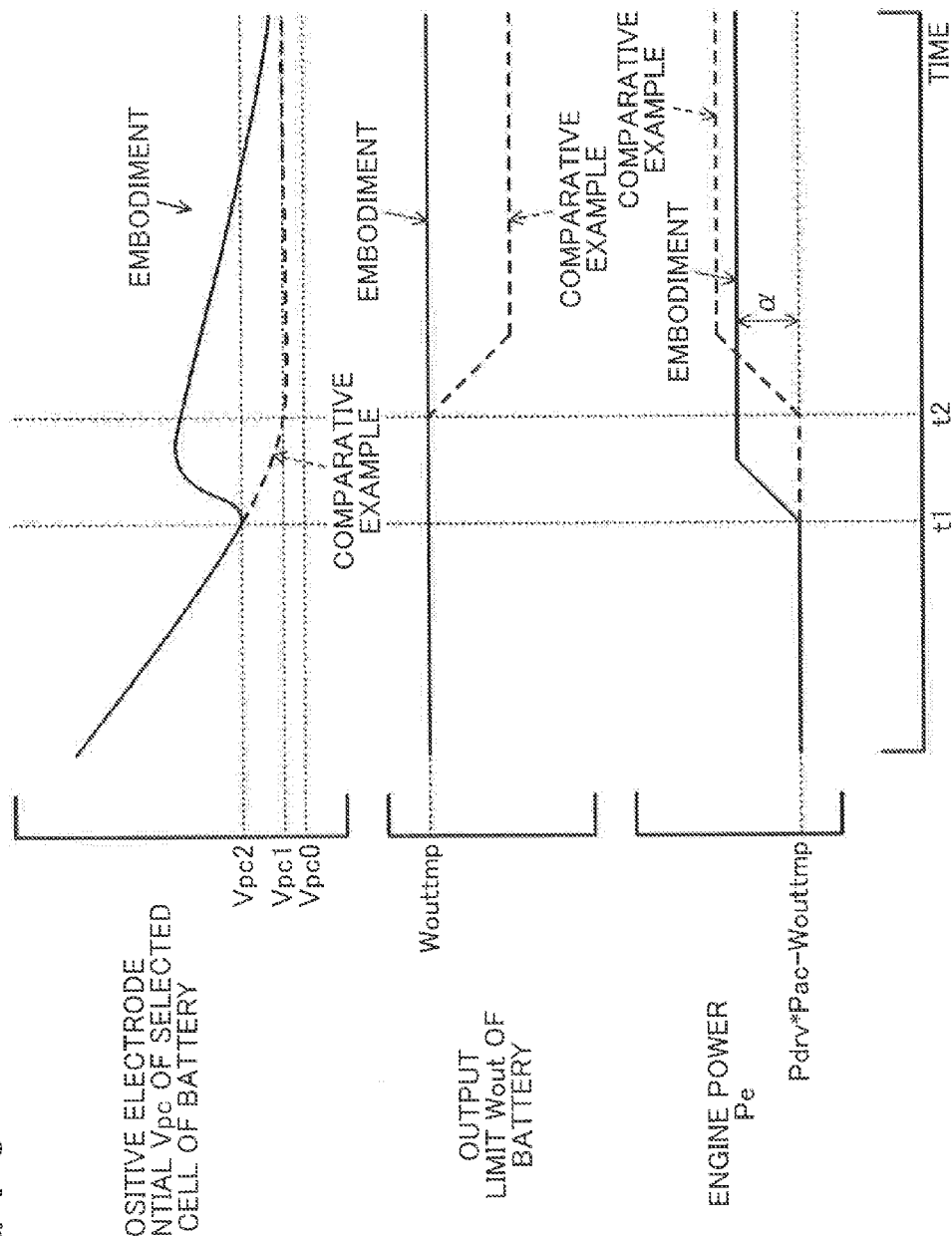

HYBRID VEHICLE

INCORPORATION BY REFERENCE

The disclosure of Japanese Patent Application No. 2014-243462 filed on Dec. 1, 2014 including the specification, drawings and abstract is incorporated herein by reference in its entirety.

BACKGROUND OF THE INVENTION

1. Field of the Invention

The invention relates to a hybrid vehicle and in particular to a hybrid vehicle that includes: an engine; a first motor capable of inputting/outputting power; a planetary gear in which three rotation elements are connected to a rotational shaft of the first motor, an output shaft of the engine, and a drive shaft coupled to an axle such that the rotational shaft, the output shaft, and the drive shaft are aligned in this order in a collinear diagram; a second motor capable of inputting/outputting the power from/to the drive shaft; and a battery capable of transmitting electric power to/from the first motor and the second motor.

2. Description of Related Art

A nickel hydrogen storage battery including: a positive electrode that contains a positive electrode active material having nickel hydroxide, to which zinc is dissolved in a solid state and added, as a main component; a negative electrode that contains a hydrogen storage alloy containing manganese; and an alkaline electrolytic solution has conventionally been suggested (for example, see Japanese Patent Application Publication No. 2004-119271 (JP 2004-119271 A)). In this nickel hydrogen storage battery, magnesium is dissolved in nickel hydroxide of the positive electrode in the solid state, and magnesium is also dissolved in the hydrogen storage alloy of the negative electrode in the solid state. In this way, elution of zinc from nickel hydroxide of the positive electrode and elution of manganese from the hydrogen storage alloy of the negative electrode, which are associated with a lapse of a charging/discharging cycle, can be suppressed. In this way, degradation of a high-rate discharging characteristic after the lapse of the charging/discharging cycle can be suppressed.

In addition, a hybrid vehicle including: an engine; a first MG; a power split device (a planetary gear) in which a sun gear, a planetary carrier, and a ring gear are connected to a transmission shaft that is coupled to the first MG, the engine, and an axle; a second MG connected to the transmission shaft; and a power storage device for transmitting electric power to/from the first MG and the second MG has been suggested (for example, see Japanese Patent Application Publication No. 2013-6430 (JP 2013-6430 A)).

In such a hybrid vehicle, in the case where the nickel hydrogen storage battery is used as the power storage device, a conductive material is possibly eluted from the positive electrode of the battery, and deterioration of the battery is possibly promoted. In the case where a positive electrode potential of the battery is lowered to suppress the deterioration of the battery, maximum allowable electric power that can be output from the battery is limited. However, in the case where the maximum allowable electric power of the battery is limited, just as described, during a reverse travel, maximum power for the reverse travel that can be output from the second MG is reduced, and thus driving performance during the reverse travel is possibly degraded.

SUMMARY OF THE INVENTION

This specification provides a hybrid vehicle that suppresses degradation of driving performance during a reverse travel.

A hybrid vehicle includes an engine, a first motor, a planetary gear, a second motor, a battery and an electronic control unit. The first motor is configured to be able to receive or output power. The planetary gear has three rotation elements, in which the three rotation elements are respectively connected to a rotational shaft of the first motor, an output shaft of the engine, and a drive shaft coupled to drive wheels, and the three rotation elements are connected such that the rotational shaft, the output shaft, and the drive shaft are aligned in this order in a collinear diagram. The second motor is configured to be able to receive the power from the drive shaft or output the power to the drive shaft. The battery is a nickel hydrogen secondary cell. The battery is configured to be able to transmit electric power to the first motor and the second motor or receive electric power from the first motor and the second motor. The electronic control unit is configured to set maximum allowable electric power of the battery such that the maximum allowable electric power becomes lower than that before a positive electrode potential of the battery is lowered to be at most equal to a first specified potential when the positive electrode potential is lowered to be at most equal to the first specified potential. The electronic control unit is configured to control the engine, the first motor, and the second motor such that the hybrid vehicle runs by power within a range of the maximum allowable electric power. The electronic control unit is configured to execute control such that a reverse travel is made while higher power than that before the positive electrode potential becomes at most equal to a second specified potential is output from the engine when the positive electrode potential becomes at most equal to the second specified potential during the reverse travel. The second specified potential is higher than the first specified potential.

The first specified potential is a slightly higher potential than a deterioration promoting potential of the battery. The deterioration promoting potential is a potential at which a conductive material is eluted from a positive electrode of the battery, and the deterioration of the battery is promoted. When the positive electrode potential of the battery is lowered to become at most equal to the first specified potential, the maximum allowable electric power of the battery is reduced from that before the positive electrode potential of the battery is lowered to become at most equal to the first specified potential. In this way, an increase of discharged electric power from the battery is suppressed, and thus the positive electrode potential of the battery can be suppressed from being lowered to become at most equal to the deterioration promoting potential. However, maximum power that can be output from the second motor is reduced by limiting the maximum allowable electric power of the battery. In particular, drive performance of the vehicle is possibly degraded in a reverse travel in which the vehicle runs mainly by drive power of the second motor.

In consideration of the above, the hybrid vehicle of the invention is controlled to make the reverse travel while higher power than that before the positive electrode potential of the battery is lowered to become at most equal to the second specified potential is output from the engine when the positive electrode potential of the battery is lowered to become at most equal to the second specified potential that is higher than the first specified potential during the reverse travel. Accordingly, when the positive electrode potential of the battery is lowered to become at most equal to the second specified potential, the output from the engine and the generated electric power by the first motor are increased. Accordingly, the discharged electric power from the battery is reduced, and thus the positive electrode potential of the battery can temporarily be increased. In this way, a time required for the positive electrode potential of the battery to become at most equal to the first specified potential can be extended, and thus a time required for the maximum allowable electric power of the battery to be reduced can be extended. As a result, the time required for the maximum power for the reverse travel that can be output from the second motor to be reduced can be extended, and thus degradation of drive performance during the reverse travel can be suppressed (the degradation thereof can be postponed).

The electronic control unit may be configured to control such that first power that is obtained by subtracting the maximum allowable electric power from a sum of drive power and electric power of an auxiliary machine is output from the engine before the positive electrode potential is lowered to become at most equal to the second specified potential during the reverse travel. The electronic control unit may be configured to control such that second power in which specified power is added to the first power is output from the engine when the positive electrode potential is lowered to become at most equal to the second specified potential during the reverse travel. Also, the electronic control unit may be configured to control such that a self-sustained operation of the engine is performed or an operation thereof is stopped in a case where the first power is at most equal to a value 0 before the positive electrode potential is lowered to become at most equal to the second specified potential during the reverse travel.

Furthermore, the specified power may also be power that is at most equal to the maximum allowable electric power.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a configuration diagram that schematically shows a configuration of a hybrid vehicle 20 as one embodiment of the invention;

FIG. 6 is an explanatory view of one example of temporal changes of a positive electrode potential Vpc of a selected cell of a battery 50, an output limit Wout of the battery 50, and power Pe of the engine 22 when the reverse travel is made while the engine 22 is operated.

DETAILED DESCRIPTION OF EMBODIMENTS

Figure 2:
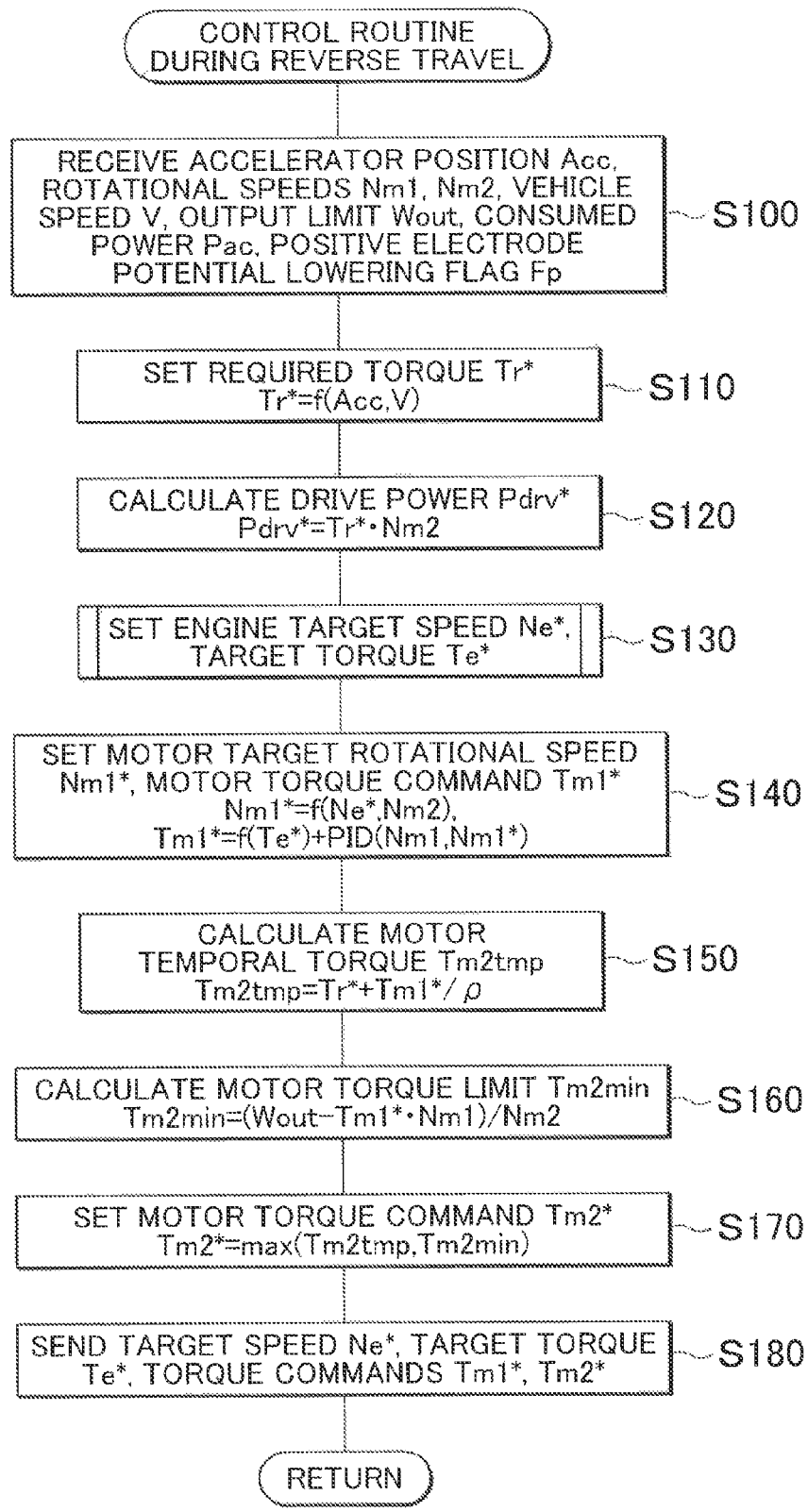
FIG. 2 is a flowchart of one example of a control routine during a reverse travel that is executed by an HVECU 70 of the embodiment.

Next, a description will be made on a mode for carrying out the invention by using an embodiment.

FIG. 1 is a configuration diagram that schematically shows a configuration of a hybrid vehicle 20 as one embodiment of the invention. As shown in the diagram, the hybrid vehicle 20 of the embodiment includes an engine 22, a planetary gear 30, motors MG1, MG2, inverters 41, 42, a battery 50, an air conditioning device 60, and a hybrid electronic control unit (hereinafter referred to as an HVECU) 70.

The engine 22 is configured as an internal combustion engine that uses gasoline, diesel file, or the like as fuel to output power. An operation of this engine 22 is controlled by an engine electronic control unit (hereinafter referred to as an engine ECU) 24.

Although not shown, the engine ECU 24 is configured as a microprocessor that has a CPU as a central component, and includes a ROM for storing a process program, a RAM for temporarily storing data, input/output ports, and a communication port, in addition to the CPU. The engine ECU 24 receives signals from various sensors that are required to control the operation of the engine 22 via the input port, for example, a crank angle $\theta cr$ from a crank position sensor 23 that detects a rotation position of a crankshaft 26 and the like. In addition, the engine ECU 24 outputs various control signals for controlling the operation of the engine 22 via the output port, for example, a drive signal to a fuel injection valve, a drive signal to a throttle motor that adjusts a position of a throttle valve, a control signal to an ignition coil that is integrated with an igniter, and the like. The engine ECU 24 is connected to the HVECU 70 via the communication port, controls the operation of the engine 22 by a control signal from the HVECU 70, and outputs data on an operation state of the engine 22 to the HVECU 70 upon necessary. It should be noted that the engine ECU 24 computes a rotational speed of the crankshaft 26, that is, a speed Ne of the engine 22 on the basis of the crank angle $\theta cr$ that is detected by the crank position sensor 23.

The planetary gear 30 is configured as a planetary gear unit of a single pinion type. A rotor of the motor MG1, a drive shaft 36 that is coupled to drive wheels 38a, 38b via a differential gear 37, and the crankshaft 26 of the engine 22 are respectively connected to a sun gear, a ring gear, and a carrier of the planetary gear 30.

The motor MG1 is configured as a synchronous generation motor, for example, and as described above, the rotor is connected to the sun gear of the planetary gear 30. The motor MG2 is configured as a synchronous generation motor, for example, and a rotor is connected to the drive shaft 36. The motors MG1, MG2 are rotationally driven when switching elements, which are not shown, the inverters 41, 42 are subjected to switching control by a motor electronic control unit (hereinafter referred to as a motor ECU) 40.

Although not shown, the motor ECU 40 is configured as a microprocessor that has a CPU as a central component, and includes a ROM for storing a process program, a RAM for temporarily storing data, input/output ports, and a communication port, in addition to the CPU. The motor ECU 40 receives signals from various sensors that are required to control driving of the motors MG1, MG2 via the input port, for example, rotation positions $\theta m1$, $\theta m2$ from rotation position detection sensors 43, 44 that respectively detect rotation positions of the rotors of the motors MG1, MG2, a phase current from a current sensor that detects a current flowing in each phase of the motors MG1, MG2, and the like. In addition, the motor ECU 40 outputs a switching control signal to each of the switching elements, which are not shown, of the inverters 41, 42 and the like via the output port. The motor ECU 40 is connected to the HVECU 70 via the communication port, controls the driving of the motors MG1, MG2 by a control signal from the HVECU 70, and outputs data on driving states of the motors MG1, MG2 to the HVECU 70 upon necessary. It should be noted that the motor ECU 40 computes rotational speeds Nm1, Nm2 of the motors MG1, MG2 on the basis of the rotation positions θm1, θm2 of the rotors of the motors MG1, MG2 that are respectively detected by the rotation position detection sensors 43, 44.

The battery 50 transmits electric power to/from the motors MG1, MG2 via the inverters 41, 42, respectively. This battery 50 is configured by connecting i (for example, 10) pieces of modules in series. Each of the i pieces of the modules is configured by connecting j (for example, 12) pieces of cells that are each configured as a nickel hydrogen secondary battery in series. The battery 50 is managed by a battery electronic control unit (hereinafter referred to as a battery ECU) 52.

Although not shown, the battery ECU 52 is configured as a microprocessor that has a CPU as a central component, and includes a ROM for storing a process program, a RAM for temporarily storing data, input/output ports, and a communication port, in addition to the CPU. The battery ECU 52 receives signals that are required to manage the battery 50 via the input port, for example, a battery voltage Vb from a voltage sensor 51$a$ that is installed between terminals of the battery 50, positive electrode potentials Vpc(1) to Vpc(k) of k (=i×j) pieces of the cells of the battery 50 from k pieces of potential sensors 51$d$(1) to 51$d$(k) that detect the positive electrode potentials of the k pieces of the cells, a battery current Ib from a current sensor 51$b$ that is attached to an electric power line connected to the output terminal of the battery 50, a battery temperature Tb from a temperature sensor 51$c$ that is attached to the battery 50, and the like. Here, the k pieces of the potential sensors 51$d$(1) to 51$d$(k) detect values (the potentials) of the positive electrodes at a time that a negative electrode potential of the each cell at reference time (for example, shipping time or the like) is set to a value 0 as the positive electrode potentials Vpc(1) to Vpc(k). This is done to detect the positive electrode potentials Vpc(1) to Vpc(k) as values that are not influenced by states of the negative electrodes (values only under influences of the positive electrodes). The battery ECU 52 is connected to the HVECU 70 via the communication port and outputs data on a state of the battery 50 to the HVECU 70 upon necessary. In order to manage the battery 50, the battery ECU 52 computes an electric power storage ratio SOC that is a ratio of electric power capacity that can be discharged from the battery 50 at the time to full capacity on the basis of an integrated value of the battery current Ib that is detected by the current sensor 51$b$, and computes input/output limits Win, Wout as maximum allowable electric power that can be stored in or discharged from the battery 50 on the basis of the computed electric power storage ratio SOC and the battery temperature Tb that is detected by the temperature sensor 51$c$. In the embodiment, the input limit Win of the battery 50 is computed by multiplying a temperature dependent value Wintb based on the battery temperature Tb by a correction coefficient kin based on the electric power storage ratio SOC. In the embodiment, as the output limit Wout of the battery 50, a basic value Wouttmp is set by multiplying a temperature dependent value Wouttb based on the battery temperature Tb by a correction coefficient kout based on the electric power storage ratio SOC. The basic value Wouttmp is set as the output limit Wout before the positive electrode potential Vpc of the selected cell of the battery 50 becomes at most equal to a threshold Vpc1, and a smaller value than the basic value Wouttmp is set as the output limit Wout once the positive electrode potential Vpc becomes at most equal to the threshold Vpc1. Here, as the positive electrode potential Vpc of the selected cell, a minimum value of the positive electrode potentials Vpc(1) to Vpc(k) of the k pieces of the cells is set. In addition, the threshold Vpc1 is set to a slightly higher potential than a deterioration promoting potential Vpc0. The deterioration promoting potential Vpc0 is a potential at which a conductive material is eluted from the positive electrode of the each cell of the battery 50 and thus the deterioration of the battery 50 is promoted. When a rated value of the positive electrode potential of the each cell of the battery 50 is, for example, 0.9 V, 1.0 V, 1.1 V, or the like and the deterioration promoting potential Vpc0 is, for example, 0.19 V, 0.20 V, 0.21 V, or the like, the threshold Vpc1 is, for example, 0.24 V, 0.25 V, 0.26 V, or the like. In the embodiment, the output limit Wout at a time that the positive electrode potential Vpc of the selected cell of the battery 50 is lower than the threshold Vpc1 is set such that the positive electrode potential Vpc of the selected cell can be suppressed from becoming at most equal to the deterioration promoting potential Vpc0.

The air conditioning device 60 is configured as an air conditioner that conditions the air in an occupant room. This air conditioning device 60 has: a refrigeration cycle including a compressor 61, a condenser, an expansion valve, and an evaporator; and a blower for blowing the air that has been cooled or warmed by heat exchange of the refrigeration cycle to the occupant room. The compressor 61 is connected to the electric power line, which connects between the inverters 41, 42 and the battery 50, via an air conditioning inverter 62.

Although not shown, the HVECU 70 is configured as a microprocessor that has a CPU as a central component, and includes a ROM for storing a process program, a RAM for temporarily storing data, input/output ports, and a communication port, in addition to the CPU. The HVECU 70 receives, via the input port, consumed electric power Pac, of the compressor 61 of the air conditioning device 60 from an electric power sensor 63, an ignition signal from an ignition switch 80, a shift position SP from a shift position sensor 82 that detects an operation position of a shift lever 81, an accelerator position Acc from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, and the like. In addition, the HVECU 70 outputs a switching control signal to a switching element, which is not shown, of the air conditioning inverter 62 and the like via the output port. As described above, the HVECU 70 is connected to the engine ECU 24, the motor ECU 40, and the battery ECU 52 via the communication port, and transmits various control signals and data to/from the engine ECU 24, the motor ECU 40, and the battery ECU 52.

The hybrid vehicle 20 of the embodiment, which is configured as described above, runs in a hybrid drive mode (an HV drive mode), in which the vehicle runs with the operation of the engine 22, and an electric drive mode (an EV drive mode), in which the vehicle runs with the operation of the engine 22 being stopped.

Next, a description will be made on an operation of the hybrid vehicle 20 of the embodiment, which is configured as described above, and in particular, on the operation thereof at a time that a reverse travel is made (in the HV drive mode)

while the engine 22 is operated. FIG. 2 is a flowchart of one example of a control routine during the reverse travel that is executed by the HVECU 70 of the embodiment. This routine is repeatedly executed at specified time intervals (for example, every few msecs) when the reverse travel is made while the engine 22 is operated.

Once the control routine during the reverse travel is executed, the HVECU 70 first enters data that is required for the control, such as the accelerator position Acc from the accelerator pedal position sensor 84, the vehicle speed V from the vehicle speed sensor 88, the rotational speeds Nm1, Nm2 of the motors MG1, MG2, the output limit Wout of the battery 50, the consumed electric power Pac of the compressor 61 of the air conditioning device 60 from the electric power sensor 63, and a positive electrode potential lowering flag Fp (step S100). Here, as the rotational speeds Nm1, Nm2 of the motors MG1, MG2, values that are computed by the motor ECU 40 on the basis of the rotation positions θm1, θm2 of the rotors of the motors MG1, MG2 detected by the rotation position detection sensors 43, 44 are input by communication. As the output limit Wout of the battery 50, a value that is computed by the battery ECU 52 is input by the communication. As the positive electrode potential lowering flag Fp, a value 0 is set by the battery ECU 52 before the positive electrode potential Vpc of the selected cell of the battery 50 becomes at most equal to a threshold Vpc2, and a value 1 is set by the battery ECU 52 once the positive electrode potential Vpc of the selected cell of the battery 50 becomes at most equal to the threshold Vpc2. Either one of the values is input by the communication. Here, as the positive electrode potential Vpc of the selected cell of the battery 50, the minimum value of the positive electrode potentials Vpc(1) to Vpc(k) of the k pieces of the cells of the battery 50, which are detected by the k pieces of the potential sensors 51d(1) to 51d(k), is set by the battery ECU 52. In addition, the threshold Vpc2 is set to a slightly higher value than the threshold Vpc1 that is slightly higher than the deterioration promoting potential Vpc0, and, for example, is set to a value that is higher than the threshold Vpc1 by about 0.08 V, 0.10V, or 0.12 V.

Figure 3:
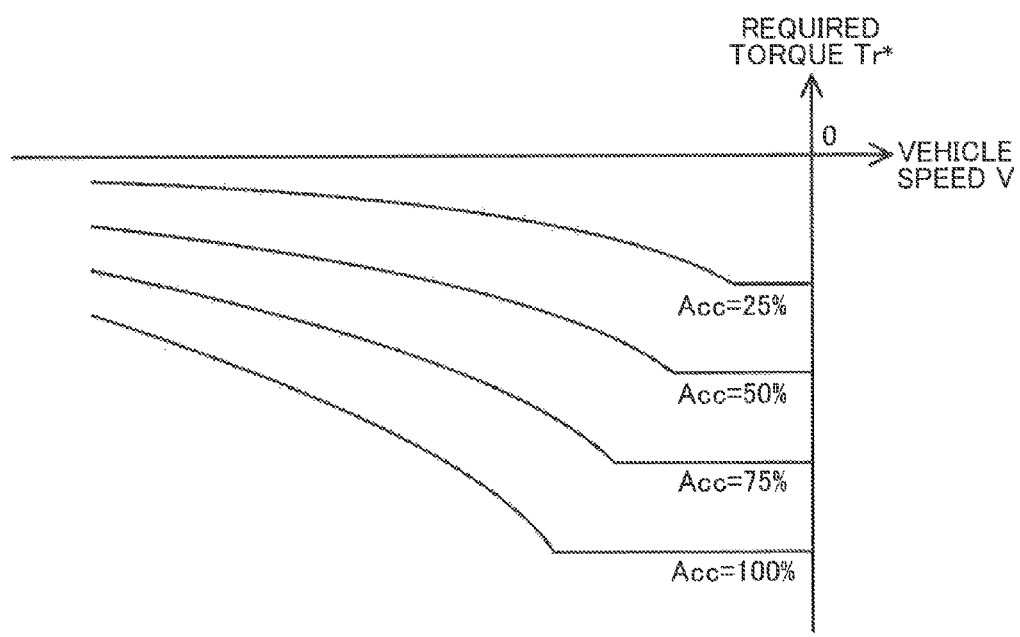
FIG. 3 is an explanatory view of one example of a required torque setting map.

When the data are input as described above, required torque Tr* that is required for the travel (required to the drive shaft 36) is set on the basis of the input accelerator position Acc and vehicle speed V (step S110), and drive power Pdrv* that is required for the travel is calculated by multiplying the set required torque Tr* by a rotational speed Nr of the drive shaft 36 (the rotational speed Nm2 of the motor MG2) (step S120). Here, in the embodiment, for the required torque Tr*, relationships among the accelerator position Acc, the vehicle speed V, and the required torque Tr* are defined in advance and stored as a required torque setting map in a ROM, which is not shown. Then, when the accelerator position Acc and the vehicle speed V are provided, the corresponding required torque Tr* is derived from the stored map and is thereby set. One example of the required torque setting map is shown in FIG. 3. As shown in the map, a negative value (a value in a reverse travel direction) is set as the required torque Tr*.

Figure 4:
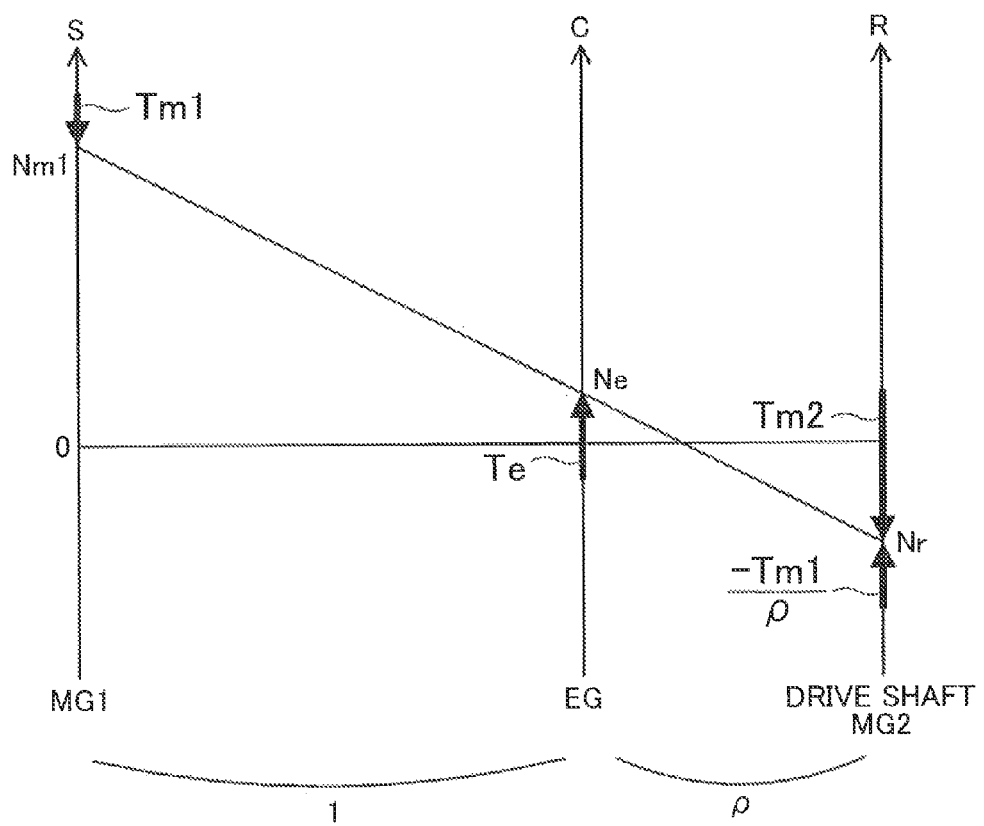
FIG. 4 is an explanatory view of one example of a collinear diagram that shows a dynamic relationship between a rotational speed and torque in each rotation element of a planetary gear 30 when a reverse travel is made while an engine 22 is operated.

Next, a target speed Ne* and target torque Te* as target operation points of the engine 22 are set by an engine target operation point setting process, which will be described below (step S130). Then, the target speed Ne* of the engine 22, the rotational speed Nr (=Nm2/Gr) of the drive shaft 36, and a gear ratio ρ of the planetary gear 30 are used to calculate a target rotational speed Nm1* of the motor MG1 by the following expression (1), and the calculated target rotational speed Nm1*, the current rotational speed Nm1 of the motor MG1, the target torque Te* of the engine 22, and the gear ratio ρ of the planetary gear 30 are used to calculate a torque command Tm1* of the motor MG1 by an expression (2) (step S140). Here, the expression (1) is a dynamic relational expression with respect to rotation elements of the planetary gear 30. One example of a collinear diagram that shows a dynamic relationship between a rotational speed and torque in the rotation element of the planetary gear 30 at a time that the reverse travel is made while the engine 22 is operated is shown in FIG. 4. In the diagram, an S-axis on the left indicates a rotational speed of the sun gear, which is the rotational speed Nm1 of the motor MG1, a C-axis indicates a rotational speed of the carrier, which is the speed Ne of the engine 22, and an R-axis indicates the rotational speed Nr of the ring gear (the drive shaft 36), which is the rotational speed Nm2 of the motor MG2. In addition, in the diagram, two bold arrows on the R-axis respectively indicate torque that is output from the motor MG1 and acts on the drive shaft 36 via the planetary gear 30 and torque that is output from the motor MG2 and acts on the drive shaft 36. The expression (1) can easily be derived by using this collinear diagram. In addition, the expression (2) is a relational expression in feedback control that is executed to rotate the motor MG1 at the target rotational speed Nm1* (rotate the engine 22 at the target speed Ne*). In the expression (2), a first term on the right side is a feedforward term, and a second term and a third term on the right side are a proportional term and an integration term of a feedback term. In addition, in the expression (2), "k1" in the second term on the right side is a gain of the proportional term, and "k2" in the third term on the right side is a gain of the integration term.

$$Nm1^* = Ne^* \cdot (1+\rho)/\rho - Nm2/(Gr \cdot \rho) \quad (1)$$

$$Tm1^* = -\rho \cdot Te^*/(1+\rho) + k1(Nm1^*-Nm1) + k2\int(Nm1^*-Nm1)dt \quad (2)$$

Then, as indicated by the following expression (3), a value that is obtained by dividing the torque command Tm1* of the motor MG1 by the gear ratio ρ of the planetary gear 30 is added to the required torque Tr*, so as to calculate temporal torque Tm2tmp that is a temporal value of a torque command Tm2* of the motor MG2 (step S150). As indicated by the expression (4), a value that is obtained by subtracting consumed electric power (generated electric power) of the motor MG1 from the output limit Wout of the battery 50 is divided by the rotational speed Nm2 of the motor MG2, so as to calculate a torque limit Tm2min that is a lower limit (an upper limit as an absolute value) of the torque that may be output from the MG2 within a range of the output limit Wout of the battery 50, and the consumed electric power of the motor MG1 is obtained by multiplying the torque command Tm1* of the motor MG1 by the current rotational speed Nm1 of the motor MG1 (step S160). As indicated by the expression (5), the temporal torque Tm2tmp of the motor MG2 is limited by the torque limit Tm2min (the lower limit thereof is guarded), so as to set the torque command Tm2* of the motor MG2 (step S170). Here, the expression (3) can easily be derived by using the collinear diagram of FIG. 4.

$$Tm2tmp = Tr^* + Tm1^*/\rho \quad (3)$$

$$Tm2min = (Wout - Tm1^* \cdot Nm1)/Nm2 \quad (4)$$

$$Tm2^* = \max(Tm2tmp, Tm2min) \quad (5)$$

Once the target speed Ne* and the target torque Te* of the engine 22, and the torque commands Tm1*, Tm2* of the motors MG1, MG2 are set as described above, the target speed Ne* and the target torque Te* of the engine 22 are sent to the engine ECU 24, and the torque commands Tm1*, Tm2* of the motors MG1, MG2 are sent to the motor ECU 40 (step S180). Then, the control routine during the reverse travel is terminated. The engine ECU 24 that has received the target speed Ne* and the target torque Te* of the engine 22 executes intake air amount control, fuel injection control, ignition control, and the like of the engine 22 such that the engine 22 is operated at the operation point defined by the target speed Ne* and the target torque Te*. In addition, the motor ECU 40 that has received the torque commands Tm1*, Tm2* of the motors MG1, MG2 executes the switching control of the switching elements of the inverters 41, 42 such that the motors MG1, MG2 are driven at the torque commands Tm1*, Tm2*.

Figure 5:
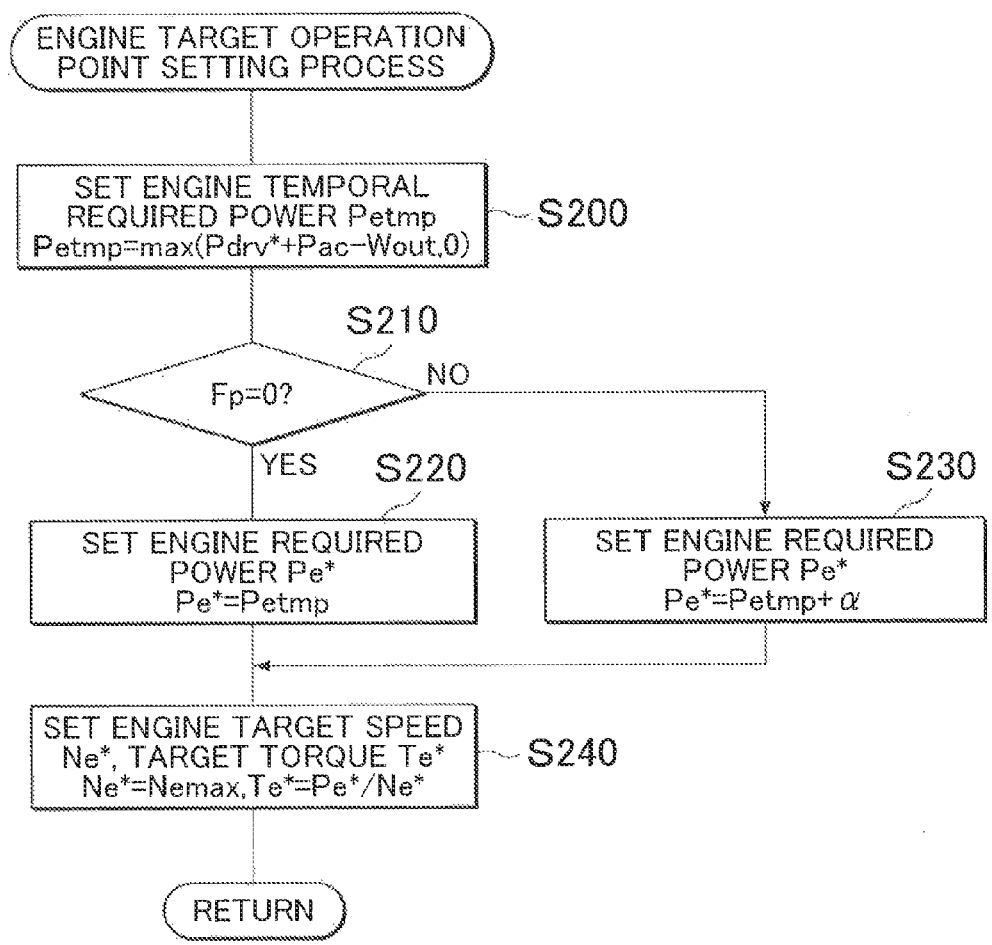
FIG. 5 is a flowchart of one example of an engine target operation point setting process.

Next, a description will be made on the process in step S130 of the control routine during the reverse travel in this FIG. 2, that is, a process for setting the target speed Ne* and the target torque Te* of the engine 22. In the embodiment, this process is executed in the engine target operation point setting process that is exemplified in FIG. 5.

In the engine target operation point setting process, as indicated by the following expression (6), the HVECU 70 first limits (guards a lower limit of) a value, which is obtained by subtracting the output limit Wout of the battery 50 from a sum of the drive power Pdrv* and the consumed electric power Pac of the compressor 61 of the air conditioning device 60, to a value 0 and sets the value as temporal required power Petmp that is a temporal value of required power Pe* of the engine 22 (step S200).

$$Petmp = \max(Pdrv^* + Pac - Wout, 0) \quad (6)$$

Next, a value of the positive electrode potential lowering flag Fp is checked (step S210). When the positive electrode potential lowering flag Fp is a value 0, it is determined that the positive electrode potential Vpc of the selected cell of the battery 50 has not yet become at most equal to the threshold Vpc2, and the temporal required power Petmp of the engine 22 is set as the required power Pe* of the engine 22 (step S220).

Once the required power Pe* of the engine 22 is set as described above, an upper limit speed Nemax of the engine 22 is set as the target speed Ne* of the engine 22, the required power Pe* of the engine 22 is divided by the target speed Ne* of the engine 22 so as to set the target torque Te* of the engine 22 (step S240), and then the engine target operation point setting process is terminated. Here, in the embodiment, as the upper limit speed Nemax of the engine 22, the upper limit speed Nemax (mg1) of the engine 22 based on performance of the motor MG1, the upper limit speed Nemax (pin) of the engine 22 based on performance of a pinion gear of the planetary gear 30, and the upper limit speed Nemax (eg) as a rated value of the engine 22 are set. Then, minimum values of these are subjected to the lower limit guard and set to the value 0. By setting the upper limit speed Nemax as the target speed Ne* of the engine 22, just as described, the speed of the engine 22 can be increased while the engine 22, the motor MG1, and the pinion gear of the planetary gear 30 are protected. In this way, compared to a hybrid vehicle in which the engine 22 is operated at a lower speed than the upper limit speed Nemax, the torque output from the engine 22 can be reduced. Thus, directly transmitted torque from the engine 22 (the torque in a forward travel direction) can be reduced.

In this case, when a value of a sum of the drive power Pdrv* and the consumed electric power Pac of the compressor 61 of the air conditioning device 60 (Pdrv*+Pac) is larger than the output limit Wout of the battery 50, the engine 22 is controlled such that a magnitude of the power that corresponds to a difference between the value (Pdrv*+Pac) and the output limit Wout is output from the engine 22. As a result, the output power from the engine 22 can relatively be reduced, and thus the directly transmitted torque from the engine 22 can relatively be reduced. In addition, when the value (Pdrv*+Pac) is at most equal to the output limit Wout of the battery 50, the engine 22 is controlled such that power in the value 0 is output from the engine 22 (a self-sustained operation of the engine 22 is performed). As a result, the directly transmitted torque from the engine 22 can further be reduced.

When the positive electrode potential lowering flag Fp is a value 1 in step S210, it is determined that the positive electrode potential Vpc of the selected cell of the battery 50 has already become at most equal to the threshold Vpc2. Then, a value that is obtained by adding correction power = to the temporal required power Petmp of the engine 22 is set as the required power Pe* of the engine 22 (step S230). Furthermore, the upper limit speed Nemax of the engine 22 is set as the target speed Ne* of the engine 22, and the required power Pe* of the engine 22 is divided by the target speed Ne* of the engine 22 so as to set the target torque Te* of the engine 22 (step S240). Then, the engine target operation point setting process is terminated.

In this case, regardless of the positive electrode potential Vpc of the battery 50, the output of the engine 22 and the generated electric power of the motor MG1 are increased from those at a time that the positive electrode potential lowering flag Fp is the value 0 (before the positive electrode potential Vpc of the selected cell of the battery 50 becomes at most equal to the threshold Vpc2). In this way, discharged electric power from the battery 50 can be reduced. When the discharged electric power from the battery 50 is reduced, the positive electrode potentials Vpc(1) to Vpc(k) of the k pieces of the cells of the battery 50 are temporarily increased and then lowered again. It should be noted that the temporal increases of the positive electrode potentials Vpc(1) to Vpc(k) are resulted from the reduction in the discharged electric power from the battery 50 (in a transition time) and the lowering of the positive electrode potentials Vpc(1) to Vpc(k) thereafter is resulted from continuation of the electric discharge from the battery 50. Just as described, a time required for the positive electrode potential Vpc of the selected cell to become at most equal to the threshold Vpc1 can be extended by temporarily increasing the positive electrode potentials Vpc(1) to Vpc(k). In this way, a time required for the output limit Wout of the battery 50 to be set to the smaller value than the basic value Wouttmp can be extended. As a result, a time required to reduce maximum power for the reverse travel that can be output from the motor MG2 can be extended, and thus the degradation of the drive performance during the reverse travel can be suppressed (the degradation thereof can be postponed).

It should be noted that, in the embodiment, as the above-described correction power α, a value that is defined in advance by an experiment, an analysis, or the like is used such that the time required for the positive electrode potential Vpc of the selected cell to become at most equal to the threshold Vpc1 is extended by about several tens of seconds to several minutes in comparison with a case where the correction power α is at most equal to the output limit Wout of the battery 50 and the correction power α is not used, in the case where the correction power α is higher than the output limit Wout of the battery 50, the battery 50 is charged, that is, the power that is more than necessary is output from the engine 22. Accordingly, the directly transmitted torque from the engine 22 (the torque in the forward travel direction) is possibly increased more than necessary, and the torque for the reverse travel that is output to the drive shaft 36 is possibly reduced more than necessary. In the embodiment, the correction power α is set to be at most equal to the output limit Wout of the battery 50. In this way, the directly transmitted torque from the engine 22 can be suppressed from being increased more than necessary, and the torque for the reverse travel that is output to the drive shaft 36 can be suppressed from being reduced more than necessary. In the embodiment, this correction power α is set to be increased as a vehicle weight is increased (the power required for the reverse travel is increased).

FIG. 6 is an explanatory view of one example of temporal changes of the positive electrode potential Vpc of the selected cell of the battery 50, the output limit Wout of the battery 50, and power Pe of the engine 22 when the reverse travel is made while the engine 22 is operated. FIG. 6 shows a case where the drive power Pdrv*, the consumed electric power Pac of the compressor 61 of the air conditioning device 60, and the basic value Wouttmp of the output limit Wout of the battery 50 are constant as a matter of simplicity. In addition, in the drawing, solid lines indicate a circumstance in the embodiment, and broken lines indicate a circumstance in a comparative example. As the comparative example, a case where the power Pe of the engine 22 is not increased (the correction power α is not added) at time t1 at which the positive electrode potential Vpc becomes at most equal to the threshold Vpc2 onward in comparison with the power Pe before the time t1 is considered. In the case of the comparative example, as indicated by the broken lines in the drawing, when the positive electrode potential Vpc becomes at most equal to the threshold Vpc1 at time t2 after the time t1, the output limit Wout of the battery 50 is set to a smaller value than the basic value Wouttmp. At the same time, the power of the engine 22 is increased to compensate for the reduced output of the battery 50. The positive electrode potential Vpc can be suppressed from becoming at most equal to a threshold Vpc0 by setting the output limit Wout to the smaller value than the basic value Wouttmp. However, since the maximum power for the reverse travel that can be output from the motor MG2 is reduced, the drive performance during the reverse travel is degraded. On the contrary, in the case of the embodiment, as shown by the solid lines in the drawing, the power Pe of the engine 22 is increased by the correction power α at the time t1 onward in comparison with the power Pe before the time t1, regardless of the positive electrode potential Vpc of the battery 50. Accordingly, the positive electrode potential Vpc can temporarily be increased, and the time required for the positive electrode potential Vpc to become at most equal to the threshold Vpc1 can be extended. In this way, the time required for the output limit Wout of the battery 50 to be set as the smaller value than the basic value. Wouttmp can be extended. As a result, the time required for the maximum power for the reverse travel that can be output from the motor MG2 to be reduced can be extended, and thus the degradation of the drive performance during the reverse travel can be suppressed (the degradation thereof can be postponed).

In the hybrid vehicle of the embodiment, which has been described so far, when the positive electrode potential Vpc of the selected cell of the battery 50 becomes at most equal to the threshold Vpc1, the output limit Wout of the battery 50 is limited (limited to the smaller value than the basic value Wouttmp) in comparison with that before the positive electrode potential Vpc becomes at most equal to the threshold Vpc1. Then, when the positive electrode potential Vpc of the selected cell of the battery 50 becomes at most equal to the threshold Vpc2, which is larger than the threshold Vpc1, during the reverse travel, the required power Pe* of the engine 22 is increased in comparison with the required power Pe* before the positive electrode potential Vpc becomes at most equal to the threshold Vpc2. In this way, the time required for the positive electrode potential Vpc to become at most equal to the threshold Vpc1 can be extended, and thus a time until the output limit Wout starts being limited can be extended. As a result, the time required for the maximum power for the reverse travel that can be output from the motor MG2 to be reduced can be extended, and thus the degradation of the drive performance during the reverse travel can be suppressed (the degradation thereof can be postponed).

In the hybrid vehicle 20 of the embodiment, before the positive electrode potential Vpc of the selected cell of the battery 50 becomes at most equal to the threshold Vpc2 during the reverse travel, as indicated by the above-described expression (6), the value (Pdrv*+Pac−Wout) is limited by the value 0 (the lower limit thereof is guarded), so as to set the temporal required power Petmp of the engine 22. This temporal required power Petmp is set as the required power Pe*. When the required power Pe* is larger than the value 0, a load operation of the engine 22 is performed. When the required power Pe* is the value 0, the self-sustained operation of the engine 22 is performed. However, when the required power Pe* is the value 0, the operation of the engine 22 may be stopped, so as to make the reverse travel in the EV travel. It should be noted that, in the case where the positive electrode potential Vpc of the selected cell of the battery 50 becomes at most equal to the threshold Vpc2 during the reverse travel, the value that is obtained by adding the correction power α to the temporal required power Petmp is set as the required power Pe*. Thus, the load operation of the engine 22 is performed.

In the hybrid vehicle 20 of the embodiment, the potential sensors 51d(1) to 51d(k) are attached to all of the k pieces of the cells of the battery 50. However, the potential sensors may be attached to a part (for example, one, a few, more than ten, or the like) of the k pieces of the cells.

In the hybrid vehicle 20 of the embodiment, the minimum value of the positive electrode potentials Vpc(1) to Vpc(k) of the k pieces of the cells of the battery 50 is set as the positive electrode potential Vpc of the selected cell, and the positive electrode potential lowering flag Fp is set in accordance with this positive electrode potential Vpc. However, the positive electrode potential lowering flag Fp may be set in accordance with the positive electrode potential Vpc of a particular cell of the k pieces of the cells of the battery 50. Alternatively, a minimum value of positive electrode potentials Vpm(1) to Vpm(i) of the i pieces of the modules of the battery 50 may be set as a positive electrode potential Vpm of a selected module, and the positive electrode potential lowering flag Fp may be set in accordance with this positive electrode potential Vpm. Furthermore, the positive electrode potential lowering flag Fp may be set in accordance with the positive electrode potential Vpm of a particular module of i pieces of the modules of the battery 50. In addition, the positive electrode potential lowering flag Fp may be set in accordance with a positive electrode potential Vpb of the entire battery 50.

In the hybrid vehicle 20 of the embodiment, although not particularly described, when the required power Pe* of the engine 22 is shifted from the temporal required power Petmp to a value that is larger than that by the correction power α (Petmp+α), the required power Pe* may gradually be shifted by using a slow change process, such as a rate process or a smoothing process. Similarly, when the output limit Wout of the battery 50 is shifted from the basic value Wouttmp to a value that is smaller than (limited from) that, the output limit Wout may also gradually be shifted by using the slow change process.

A description will be made on corresponding relationships between main components of the embodiment and main components of the invention. In the embodiment, the engine 22 is an example of the "engine", the motor MG1 is an example of the "first motor", and the planetary gear 30 is an example of the "planetary gear", the motor MG2 is an example of the "second motor", the battery 50 is an example of the "battery", and the HVECU 70, the engine ECU 24, and the motor ECU 40 are an example of the "electronic control unit".

It should be noted that, since the corresponding relationships between the main components of the embodiment and the main components of the invention, are merely an example for specifically explaining the mode for carrying out the invention by the embodiment, the components of the invention are not limited. In other words, the embodiment is merely the specific example of the invention.

The mode for carrying out the invention has been described so far by using the embodiment. However, needless to say, the invention is not limited to such an embodiment in any manner and can be implemented in various modes without departing from the gist of the invention.

The invention can be used in the hybrid vehicle manufacturing industry and the like.

The invention claimed is:

1. A hybrid vehicle comprising:
   an engine;
   a first motor configured to be able to receive or output power;
   a planetary gear having three rotation elements, in which the three rotation elements are respectively connected to a rotational shaft of the first motor, an output shaft of the engine, and a drive shaft coupled to drive wheels, and the three rotation elements are connected such that the rotational shaft, the output shaft, and the drive shaft are aligned in a collinear diagram such that the output shaft is aligned between the rotational shaft and the drive shaft in the collinear diagram;
   a second motor configured to be able to receive the power from the drive shaft or output the power to the drive shaft;
   a battery being a nickel hydrogen secondary cell, the battery configured to be able to transmit electric power to the first motor and the second motor or receive electric power from the first motor and the second motor; and
   an electronic control unit configured to set maximum allowable electronic power of the battery such that the maximum allowable electronic power of the batter when a positive electrode potential of the battery is equal to or lower than a first specified potential is smaller than the maximum allowable electronic power of the battery when the positive electrode potential of the battery is higher than the first specified potential, the electronic control unit being configured to control the engine, the first motor, and the second motor such that the hybrid vehicle runs by power within a range of the maximum allowable electric power, the electronic control unit being configured to control a required power of the engine such that the required power of the engine when the positive electrode potential of the battery is equal to or lower than a second specified potential is larger than the required power of the engine when the positive electrode potential of the battery is higher than the second specified potential during a reverse travel, and in which the second specified potential is higher than the first specified potential.

2. The hybrid vehicle according to claim 1, wherein the electronic control unit is configured to control the required power of the engine such that first power that is obtained by subtracting the maximum allowable electric power from a sum of drive power and electric power of an auxiliary machine is output from the engine before the positive electrode potential is lowered to become equal to or lower than the second specified potential during the reverse travel, and the electronic control unit is configured to control the required power of the engine such that second power in which specified power is added to the first power is output from the engine when the positive electrode potential is lowered to become equal to or lower than the second specified potential during the reverse travel.

3. The hybrid vehicle according to claim 2, wherein the electronic control unit is configured to control the engine such that a self-sustained operation of the engine is performed or an operation thereof is stopped in a case where the first power is equal to or less than a value of zero before the positive electrode potential is lowered to become equal to or lower than the second specified potential during the reverse travel.

4. The hybrid vehicle according to claim 2, wherein the specified power is set to be equal to or less than the maximum allowable electric power of the battery.

* * * * *